(12) United States Patent
Matsumoto et al.

(10) Patent No.: US 10,740,874 B2
(45) Date of Patent: Aug. 11, 2020

(54) APPARATUS, METHOD AND COMPUTER PROGRAM PRODUCT FOR ORIENTED INPUT OPERATIONS

(71) Applicant: LENOVO (Singapore) PTE. LTD., New Tech Park (SG)

(72) Inventors: Kazuo Matsumoto, Machida (JP); Setsuko Kawakami, Ayase (JP); Eiji Ogata, Fujisawa (JP); Tsutomu Mitsuhashi, Fujisawa (JP); Yoshihiro Amenomiya, Yokosuka (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/492,858

(22) Filed: Apr. 20, 2017

(65) Prior Publication Data

US 2017/0365041 A1    Dec. 21, 2017

(30) Foreign Application Priority Data

Jun. 17, 2016    (JP) .................................. 2016-120877

(51) Int. Cl.
*G06T 3/60* (2006.01)
*G06F 1/16* (2006.01)
*G06F 3/0481* (2013.01)
*G06F 3/0488* (2013.01)

(52) U.S. Cl.
CPC .............. *G06T 3/60* (2013.01); *G06F 1/1616* (2013.01); *G06F 1/1618* (2013.01); *G06F 3/0481* (2013.01); *G06F 3/0488* (2013.01); *G06F 2200/1614* (2013.01)

(58) Field of Classification Search
CPC ....... G06T 3/60; G06F 1/1616; G06F 3/0488; G06F 3/0481
See application file for complete search history.

(56) References Cited

U.S. PATENT DOCUMENTS

| | | | |
|---|---|---|---|
| 6,693,612 | B1 | 2/2004 | Matsumoto et al. |
| 9,317,243 | B2 * | 4/2016 | Becze ........................ G06F 3/01 |
| 2013/0300671 | A1 * | 11/2013 | Hallerstrom Sjostedt ................... G06F 1/1626 345/173 |
| 2014/0259029 | A1 * | 9/2014 | Choi ..................... G06F 3/0481 719/318 |
| 2015/0379964 | A1 * | 12/2015 | Lee .......................... G09G 5/12 345/173 |

FOREIGN PATENT DOCUMENTS

| | | |
|---|---|---|
| CN | 1670687 A | 9/2005 |
| CN | 1855001 A | 11/2006 |

(Continued)

*Primary Examiner* — Andrew Sasinowski
(74) *Attorney, Agent, or Firm* — Kunzler Bean & Adamson (57) ABSTRACT

An apparatus, a method and a computer program product are disclosed. The apparatus includes a display that displays an image, a timing detection unit that detects an input operation timing, and an input area display unit that displays an input area oriented towards a preset direction. The method includes displaying an image, detecting a timing of an input operation, and displaying an input area oriented towards a preset direction. The computer program product includes a computer readable storage medium that stores code to perform displaying an image, detecting a timing of an input operation.

18 Claims, 10 Drawing Sheets

(56) References Cited

FOREIGN PATENT DOCUMENTS

| | | |
|---|---|---|
| CN | 103218060 A | 7/2013 |
| CN | 104820562 A | 8/2015 |
| CN | 105260118 A | 1/2016 |
| DE | 10314556 A1 | 10/2004 |
| EP | 0660217 A1 | 6/1995 |
| JP | H06259166 A | 9/1994 |
| WO | 2015/038101 A1 | 3/2015 |

* cited by examiner

APPARATUS, METHOD AND COMPUTER PROGRAM PRODUCT FOR ORIENTED INPUT OPERATIONS

CROSS-REFERENCE TO RELATED APPLICATIONS

This patent application claims priority to Japanese Patent Application No. JP2016-120877 filed on 17 Jun. 2016 for Matsumoto, et al., the entire contents of which are incorporated herein by reference for all purposes.

FIELD

The present disclosure relates to information processing devices, methods, and programs for input operations.

BACKGROUND

Presentations are commonly made with electronic devices that rotate the images displayed on the electronic device such that the orientation is proper for the viewer. However, the orientation is often not proper for the presenter, and making input operations in such an orientation becomes difficult.

BRIEF SUMMARY

An apparatus, a method and a computer program product are disclosed.

The apparatus comprises a display that displays an image; a timing detection unit that detects a timing when a user performs an input operation; and an input area display unit that displays an input area oriented towards a preset direction as a target of the input operation after the timing detection unit detects the input operation.

The method comprises displaying an image on a display of an electronic device; detecting a timing when a user performs an input operation to the electronic device; and displaying an input area oriented towards a preset direction on the display of the electronic device as a target of the input operation.

The computer program product comprises a computer readable storage medium that stores code executable by a processor, the executable code comprising code to perform: displaying an image on a display of an electronic device; detecting a timing when a user performs an input operation to the electronic device; and displaying an input area oriented towards a preset direction on the display of the electronic device as a target of the input operation.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a flowchart showing the procedure when a flip mode according to one embodiment is turned ON.

DETAILED DESCRIPTION

As will be appreciated by one skilled in the art, aspects of the embodiments may be embodied as an apparatus, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The following describes one embodiment of an information processing device, a method for inputting, and a program with reference to the drawings. In the present embodiment, a laptop PC is described as the information processing device.

Figure 1:
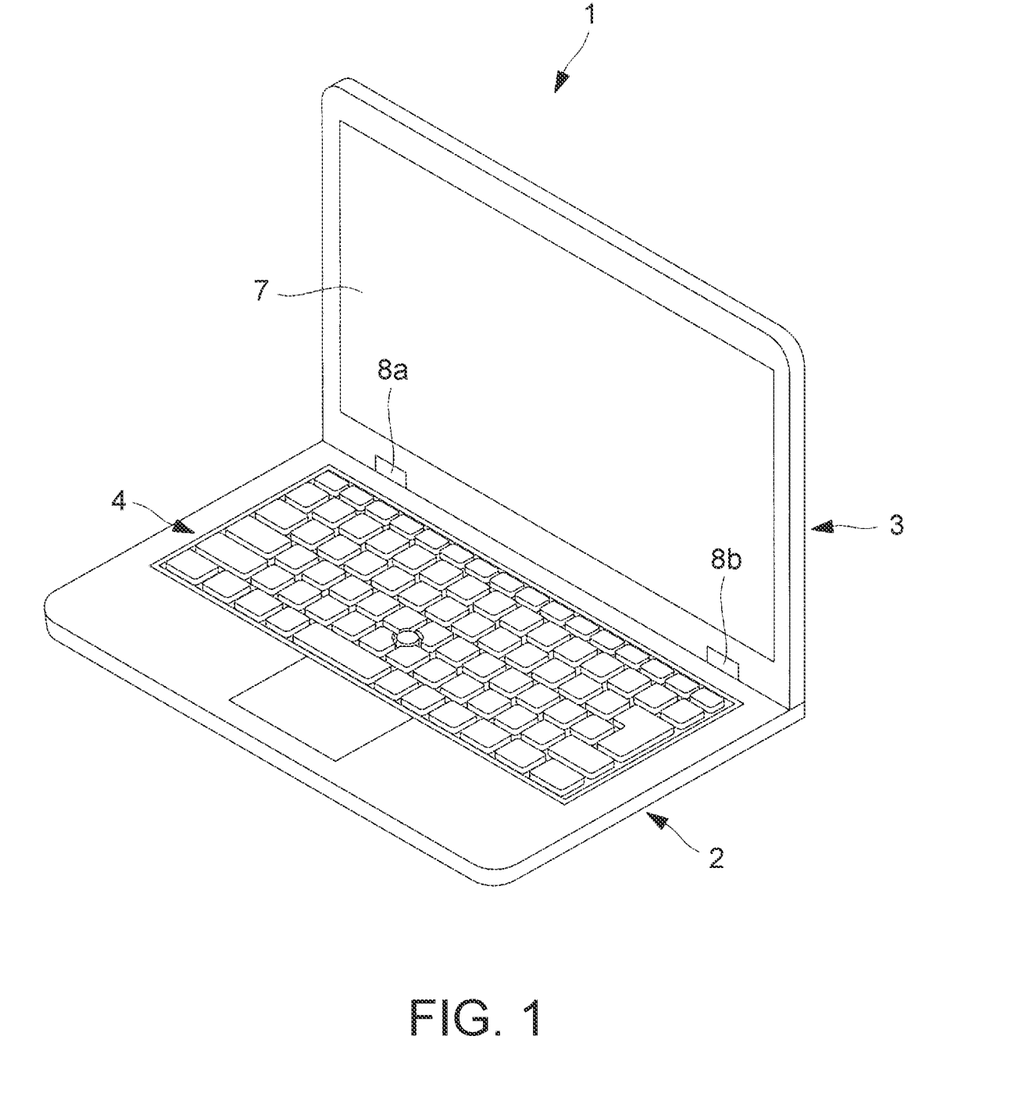
FIG. 1 shows the appearance of a laptop PC according to one embodiment.

FIG. 1 schematically shows the appearance of a laptop PC 1 according to the present embodiment. As shown in FIG. 1 as one example, the laptop PC 1 includes a body chassis 2 and a display chassis 3, and both of these chassis are a substantially cuboid.

The body chassis 2 includes an input part 4. The input part 4 is a user interface to enable a user to perform input operations. The input part includes a keyboard made up of various types of keys for inputting of letters, commands and the like, a touch pad to let the user move a cursor on the display or select various menus, a mouse, and a track point.

The display chassis 3 includes a touch-screen display 7 to display an image. The touch-screen display 7 is configured to convert an input display data into a video signal and display various types of information corresponding to the converted video signal on the display screen, and to detect various types of operations by the user using fingers or a pointer such as a touch pen.

The body chassis 2 and the display chassis 3 are joined by a left and right pair of joining parts 8a and 8b at their ends. The joining parts 8a and 8b are hinges, and support the body chassis 2 and the display chassis 3 openably and closably.

Figure 2:
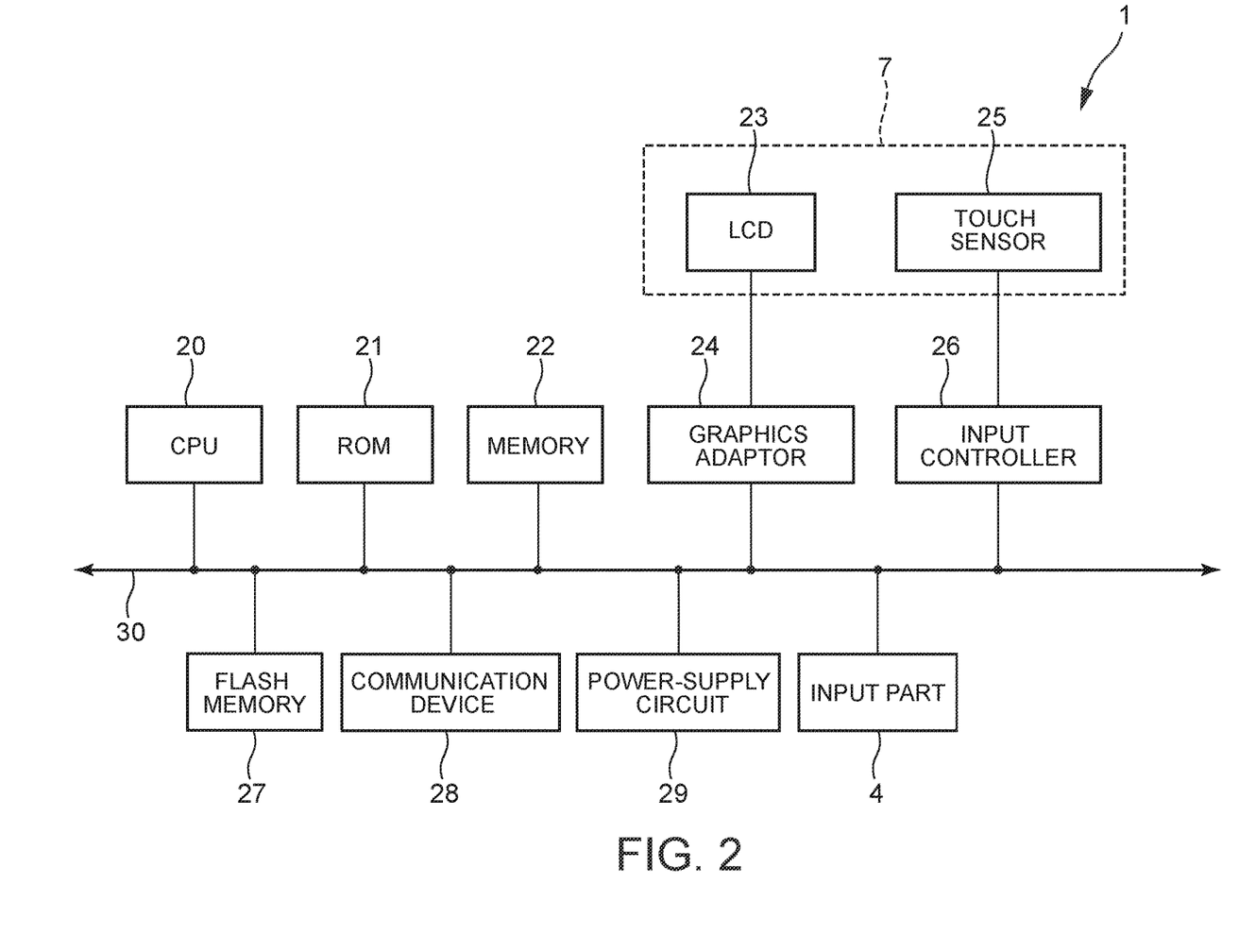
FIG. 2 schematically shows the hardware configuration of the laptop PC according to one embodiment.

FIG. 2 schematically shows the hardware configuration of the laptop PC 1.

The laptop PC 1 includes a CPU (Central Processing Unit) 20, a ROM (Read Only Memory) 21, a memory 22, a LCD (Liquid Crystal Display) 23, a graphics adaptor 24, a touch sensor 25, an input controller 26, a flash memory 27, a communication device 28 and a power-supply circuit 29, and they are directly or indirectly connected via a bus 30. The touch-screen display 7 includes the LCD 23 and the touch sensor 25.

The CPU 20 has a function of controlling the laptop PC 1 as a whole by an OS (Operating System) stored in the flash memory 27, and of executing processing corresponding to user's manipulation using the input part 4, the touch-screen display 7 and the like in accordance with various programs stored in the flash memory 27.

The ROM 21 stores BIOS (Basic Input/Output System) and various types of data.

The memory 22 is made up of a cache memory and a RAM (Random Access Memory), and is a writable memory that can be used as a workspace to read execution programs of the CPU 20 and write processed data by the execution programs.

The LCD 23 displays a video signal from the graphics adaptor 24 as an image under the control of the CPU 20. The graphics adaptor 24 converts information to be displayed into video signals under the control of the CPU 20 and outputs the converted video signal to the LCD 23.

The touch sensor 25 detects a touch position with fingers of the user or the touch pen on the LCD 23, and outputs the position to the input controller 26. The touch sensor 25 allows the user to perform various operations using fingers, a touch pen or the like. The various operations include input operations performed by selecting on-screen objects, such as various menus, icons, buttons and keyboards, displayed on the screen of the LCD 23, input operations of texts, and screen operations, such as scrolling and swiping.

The input controller 26 controls the operation of the touch sensor 25 through the execution of programs stored in the ROM 21 or the like by the processor.

The flash memory 27 has a function of storing the OS for the overall control of the laptop PC 1, various types of drivers for hardware manipulation of peripherals, applications for specific tasks, and various types of data and files. The laptop PC 1 may include another storage unit, such as a HDD (Hard Disk Drive), instead of the flash memory 27.

The communication device 28 communicates with other devices.

The power-supply circuit 29 includes an AC adaptor, an intelligent battery, a charger to charge the intelligent battery, and a DC/DC converter, and supplies electricity to the devices under the control of the CPU 20.

The laptop PC 1 according to the present embodiment can be opened so that the body chassis 2 and the display chassis 3 are flat via the joining parts 8a and 8b. Being flat refers to that the laptop PC is opened so that the body chassis 2 and the display chassis 3 are substantially at the 180-degree position. When the laptop PC 1 is opened to be flat, the laptop PC is in a flat mode.

The laptop PC 1 is set in the flat mode, for example, when a user (or speaker) on the side of the body chassis 2 makes a presentation to a person (or viewer) on the side of the display chassis 3. During the presentation, an image (hereinafter called "LCD screen") 7A that is, as a whole, displayed on the touch-screen display 7 is rotated by a predetermined angle so that the image is directed to the viewer. This is for easy understanding of the presentation by the viewer. In the following description, the angle 0 degrees is defined so that the LCD screen 7A is not rotated and is directed to the speaker.

Figure 3:
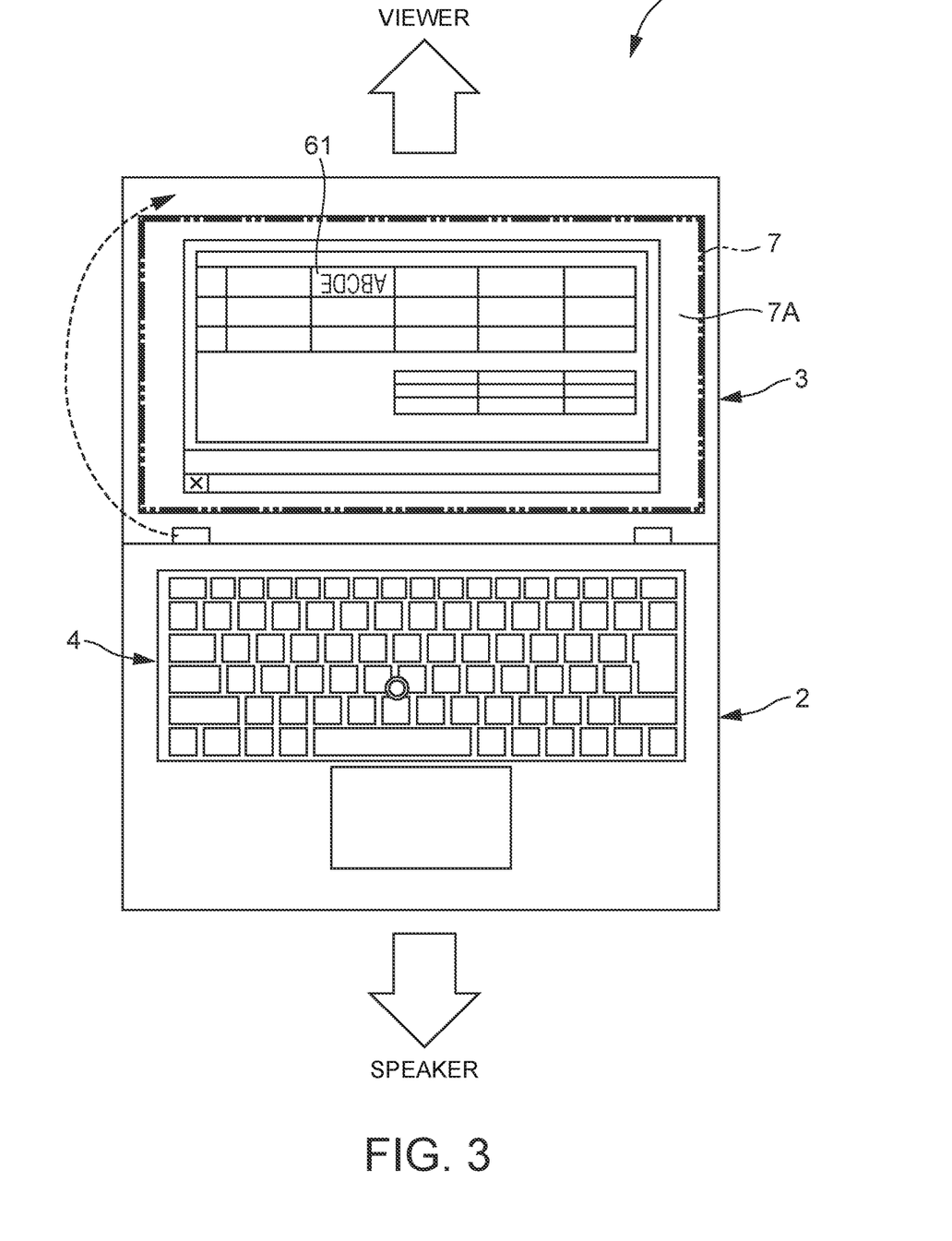
FIG. 3 shows a flat mode according to one embodiment in which a LCD screen as a whole is rotated.

FIG. 3 shows the flat mode in which the LCD screen 7A as a whole is rotated. In the example of FIG. 3, the viewer faces the speaker, and the LCD screen 7A is rotated by 180 degrees relative to the speaker. Note here that the rotation angle of the LCD screen 7A is set beforehand. For instance, when the viewer is on the right of the speaker, the angle is 90 degrees, and when the viewer is on the left of the speaker, the angle is 270 degrees. This rotation angle is called a setting rotation angle.

When the LCD screen 7A is rotated, however, the LCD screen 7A is not directed to the speaker because the speaker is on the side of the body chassis 2. Therefore, it is difficult for the speaker to perform input operations, such as inputting of letters.

The laptop PC 1 according to the present embodiment is configured so that, when detecting timing of input operation by the speaker, an input area (hereinafter called "input field") as a target of the input operation is directed to a preset direction that is different from the direction of the LCD screen 7A. In the following description, this processing is called a flip mode.

The input operation in this case includes inputting letters, drawing graphics, attaching other images such as photos, and editing and deleting letters and graphics. The input field includes cells in a spreadsheet software, a text writing area in a document creation software, and a graphics drawing area in a graphic drawing software. The preset direction that is different from the direction of the LCD screen 7A is the direction of the input part 4, for example. In other words, this is the angle 0 degrees.

Figure 4:
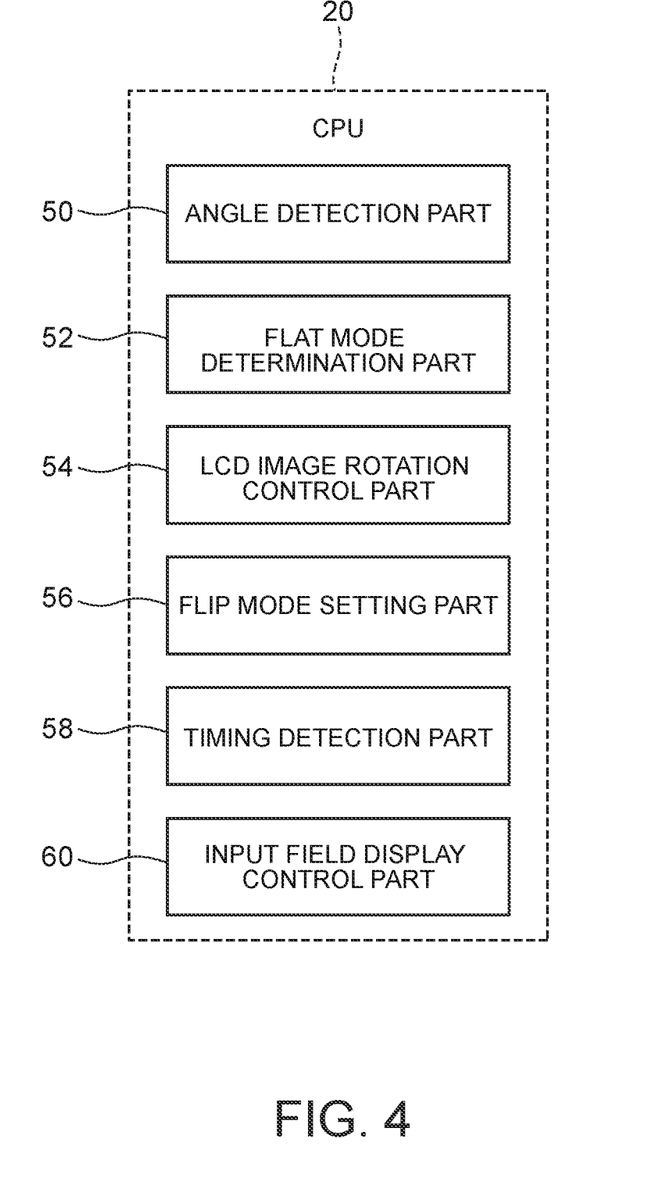
FIG. 4 is a functional block diagram about the flip mode according to one embodiment.

FIG. 4 is a functional block diagram about the flip mode.

The CPU 20 includes an angle detection part 50, a flat mode determination part 52, a LCD image rotation control part 54, a flip mode setting part 56, a timing detection part 58 and an input field display control part 60. These parts of the CPU 20 are implemented by a computer program.

The angle detection part 50 detects the opening angle between the body chassis 2 and the display chassis 3. The opening angle may be detected by measuring the tilt of the display chassis 3 using a sensor such as an acceleration sensor disposed at the display chassis 3, for example, or may be detected by other conventionally known methods.

The flat mode determination part 52 determines whether the angle detected by the angle detection part 50 is the angle for the flat mode (about 180 degrees) or not.

When the angle corresponds to the flat mode, the LCD image rotation control part 54 rotates the LCD screen 7A as a whole at a setting rotation angle. When the LCD screen 7A as a whole is rotated at a setting rotation angle in this way, the LCD screen 7A as a whole is not directed to the speaker. Note here that the LCD screen 7A may not be rotated in the flat mode, and in this case, the flip mode is not activated.

The flip mode setting part 56 sets ON or OFF of the flip mode in accordance with the manipulation by the user.

The timing detection part 58 and the input field display control part 60 are activated when the flip mode is ON.

The timing detection part 58 detects input-start timing that is timing when the user performs input operation in the input field displayed on the display. The input-start timing may be timing when the input field (e.g., a cell 61) is selected with a mouse cursor, or timing when the user double-clicks the beginning of the input part, for example. The input-start timing may be timing when the user performs key operation set beforehand or timing when the user presses a button displayed beforehand on the touch-screen display 7.

The timing detection part 58 detects input-end timing as well, and this is the timing when the input operation in the input field ends. The input-end timing may be timing when the user double-clicks the end of the part for the input operation, timing when the user performs key operation set beforehand or timing when the user presses a button displayed beforehand on the touch-screen display 7, for example. The input-end timing may be timing when the laptop PC 1 has an angle other than that of the flat mode.

When the timing detection part 58 detects the input timing, the input field display control part 60 directs the input field toward the input part 4 at the input-start timing as trigger. This allows the input field to be directed to the speaker temporarily when the speaker performs input operation, and therefore it becomes easy for the speaker to perform the input operation in the input field.

Figure 5:
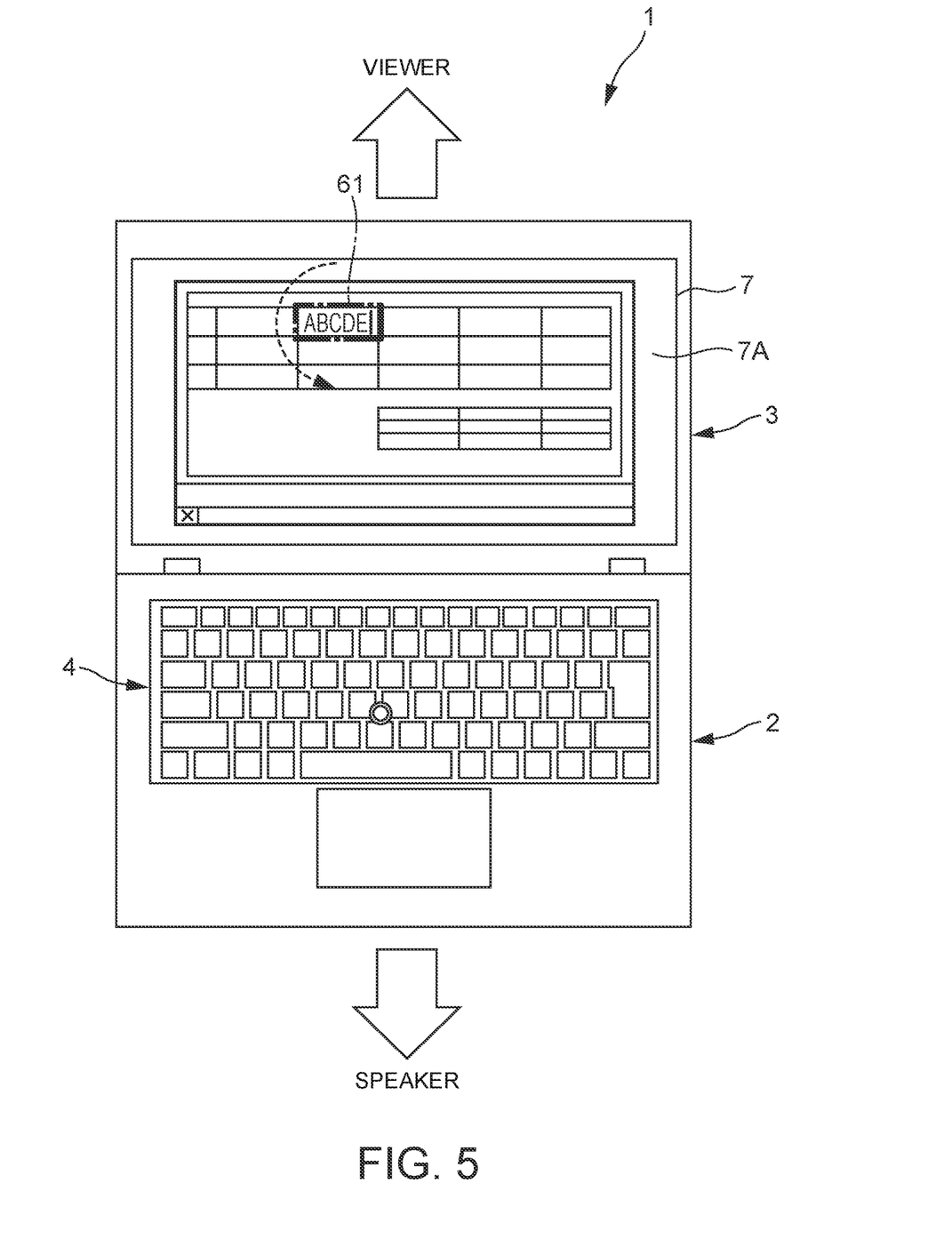
FIG. 5 shows a flip mode according to one embodiment in which an input field is rotated.

FIG. 5 shows the flip mode, in which the input field is directed toward the input part 4. In the example of FIG. 5, the cell 61 of the spreadsheet software is illustrated as the input field, and the cell 61 itself is rotated, which is a part of the LCD screen 7A.

Figure 6:
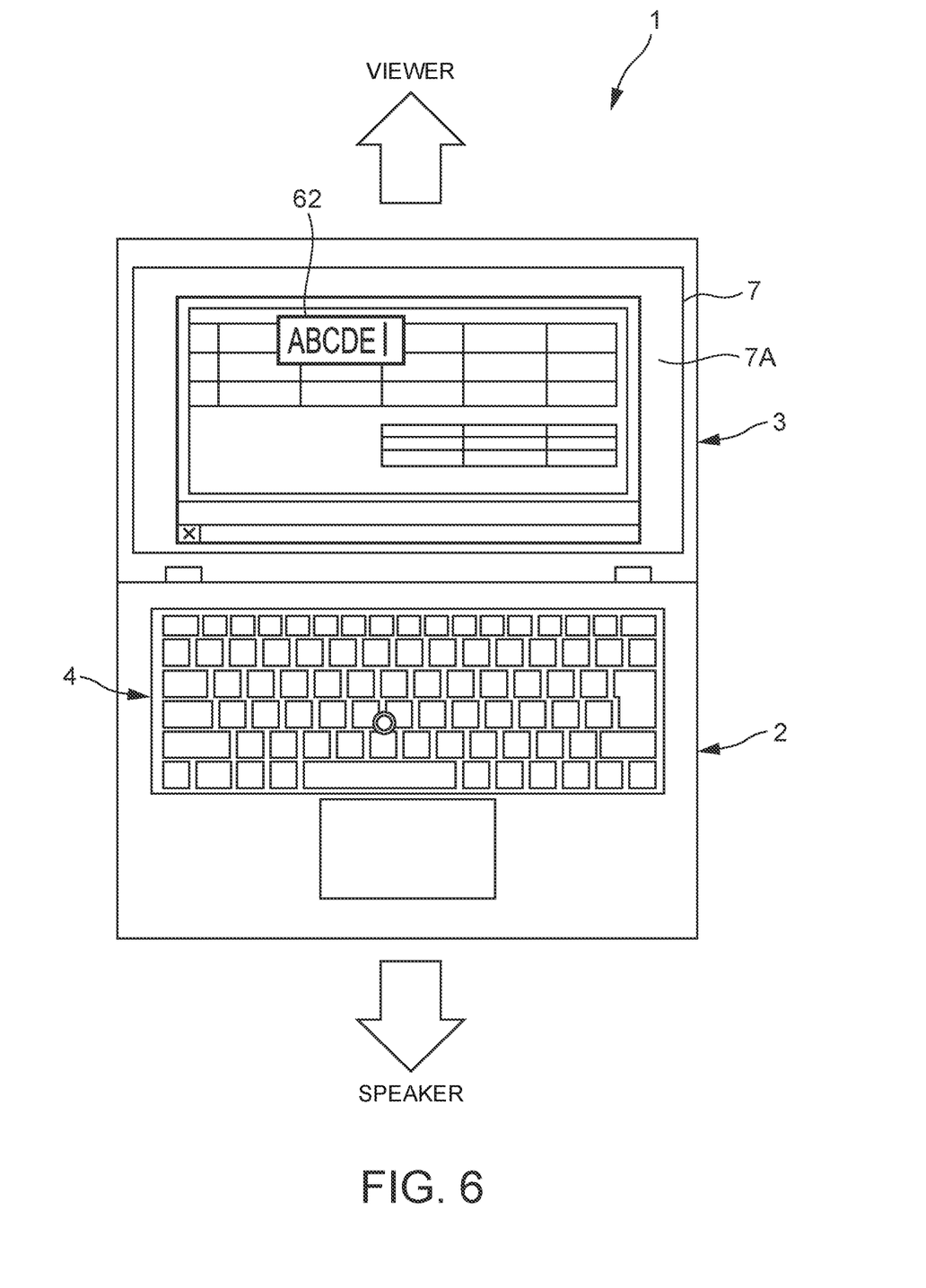
FIG. 6 shows a flip mode according to one embodiment in which an input field is popped up.

FIG. 6 shows an example where the input field is popped up. In the example of FIG. 6, when the input-start timing is detected, the cell 61 itself is not rotated unlike FIG. 5, and a popup window 62 functioning as a text box is directed toward the input part 4 for displaying. The speaker performs input operation in the popup window 62 displayed, and the input content is reproduced on the LCD screen 7A.

Figure 7:
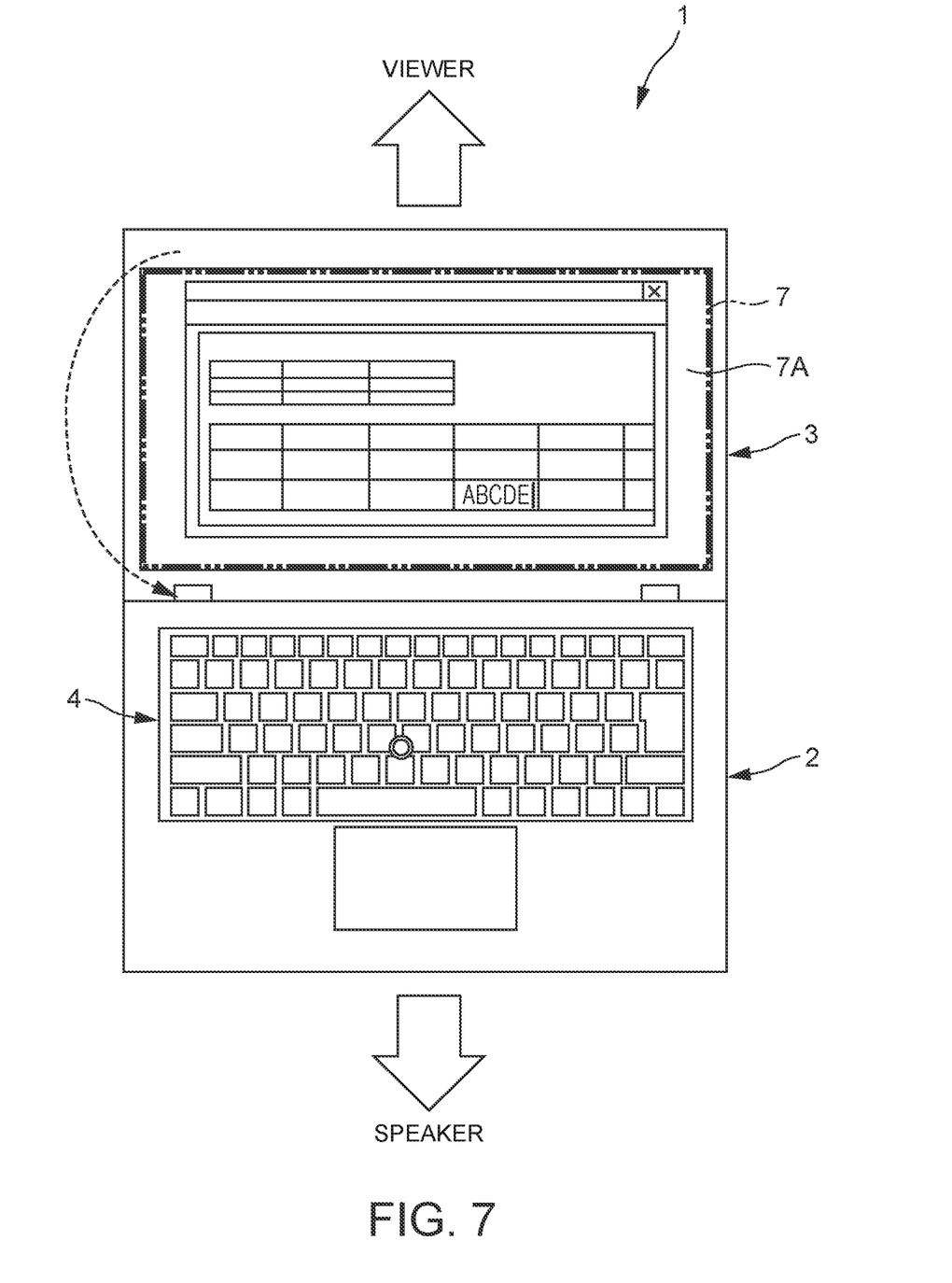
FIG. 7 shows a flip mode according to one embodiment in which a LCD screen as a whole is rotated.

As shown in FIG. 7, the LCD screen 7A as a whole may be rotated in the flip mode so that it is directed toward the input part 4. Especially when graphics displayed on the touch-screen display 7 are input (edited), input operation cannot be performed in the cell 61 or in the popup window 62 that is rotated partially. In that case, the LCD screen 7A as a whole may be rotated. In other words, a target for rotation varies with what is to be input. For instance, when a graphic drawing software is activated, the LCD screen 7A as whole is rotated at the input-start timing when the user double-clicks the graphic drawing area.

The input field display control part 60 controls the content corresponding to the input operation that is reproduced on the LCD screen 7A at the input-end timing. For instance, in the example of FIG. 5, the input field is directed to the original direction (direction of the viewer). In the example of FIG. 6, the popup window 62 as the input field disappears. In the example of FIG. 7, the LCD screen 7A as a whole is directed to the original direction (direction of the viewer). This allows the viewer to understand the content on the LCD screen 7A after the input operation easily.

Figure 8:
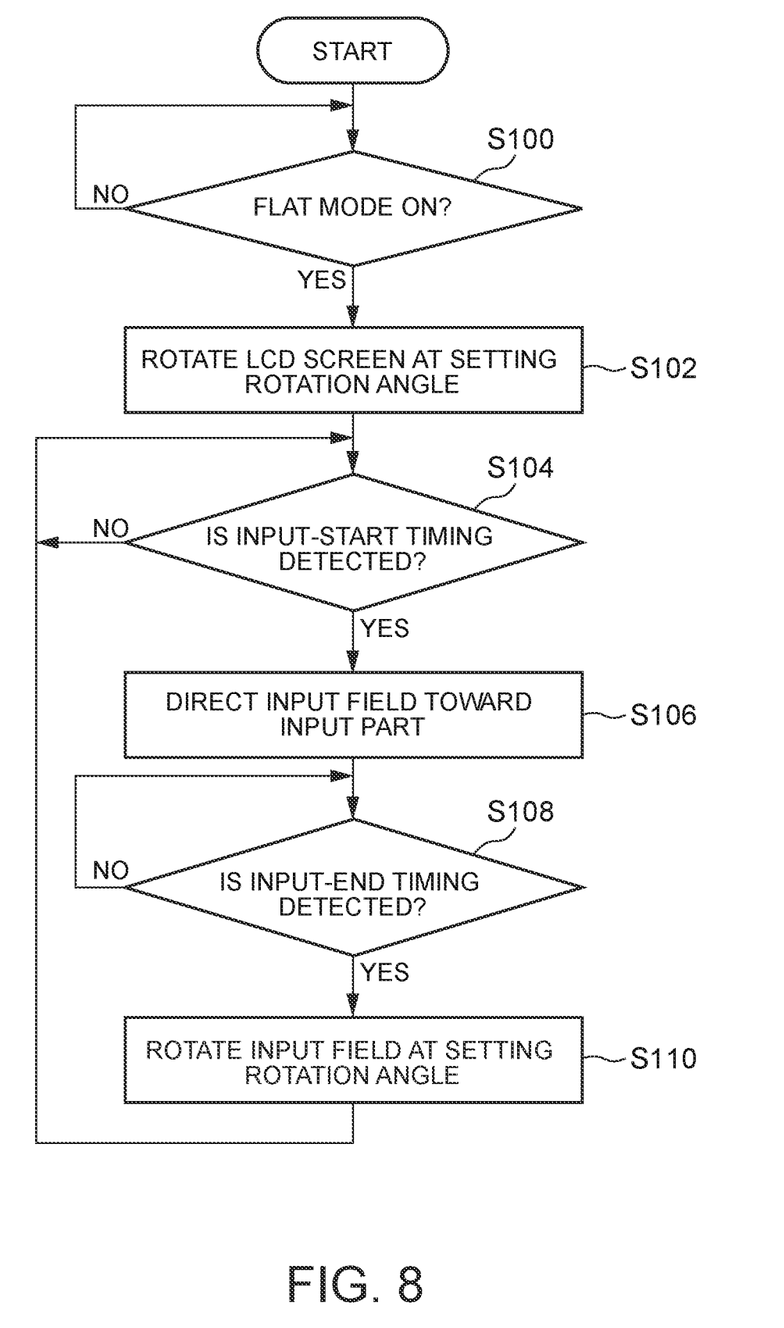

Next, the following describes the processing when the flip mode is ON, with reference to FIG. 8.

Firstly, at step 100, determination is made whether the laptop PC 1 is in the flat mode or not. When it is in the flat mode, the procedure shifts to step 102.

At step 102, the LCD screen 7A as a whole is rotated at a setting rotation angle. As a result, the LCD screen 7A as a whole is not directed to the speaker who performs input operation.

At the next step 104, determination is made whether the input-start timing is detected or not. When the input-start timing is detected, the procedure shifts to step 106.

At the next step 106, the input field is directed toward the input part 4.

At the next step 108, determination is made whether the input-end timing is detected or not. When the input-end timing is detected, the procedure shifts to step 110.

At step 110, the input field is directed to the original direction (direction of the viewer), and the procedure returns to step 104. The above processing is repeated until the flip mode is turned OFF or the laptop PC 1 has an angle other than the flat mode.

As described above, the laptop PC 1 according to the present embodiment includes the body chassis 2 having the input part 4 for input operation by the user and the display chassis 3 having the touch-screen display 7. The laptop PC 1 is configured to rotate an image displayed on the touch-screen display 7 at a predetermined angle. Then, the laptop PC 1 is configured so that, when detecting timing of input operation by the user, an input field as a target of the input operation is directed to a direction set beforehand that is different from the direction of the LCD screen 7A.

Such a laptop PC 1 allows the input field to be directed to the user temporarily when the user performs input operation, and therefore it becomes easy for the user to perform the input operation even when the image displayed on the touch-screen display 7 is not directed to the user.

That is the description of the present disclosure by way of the embodiments as stated above. The technical scope is not limited to the above embodiments. Various changes or modifications may be added to the above embodiments without deviating from the scope of the disclosure, and the technical scope of the present disclosure covers such a changed or modified embodiment as well. The above embodiments may be combined as needed.

For instance, in the above embodiments, the body chassis 2 has a physical keyboard, and the embodiments are not limited to such a configuration. For instance, the body chassis 2 also includes a touch-screen display 7, and a software keyboard may be displayed as the input part 4 on the touch-screen display 7 instead of the physical keyboard.

In the configuration of the body chassis 2 also including the touch-screen display 7, the body chassis 2 and the display chassis 3 may be disconnected for operation.

In the above embodiments, the information processing device is the laptop PC 1. The embodiments are not limited to this, and the information processing device may be a tablet-type device 70 including one touch-screen display 7 as shown in FIGS. 9 and 10.

Figure 9:
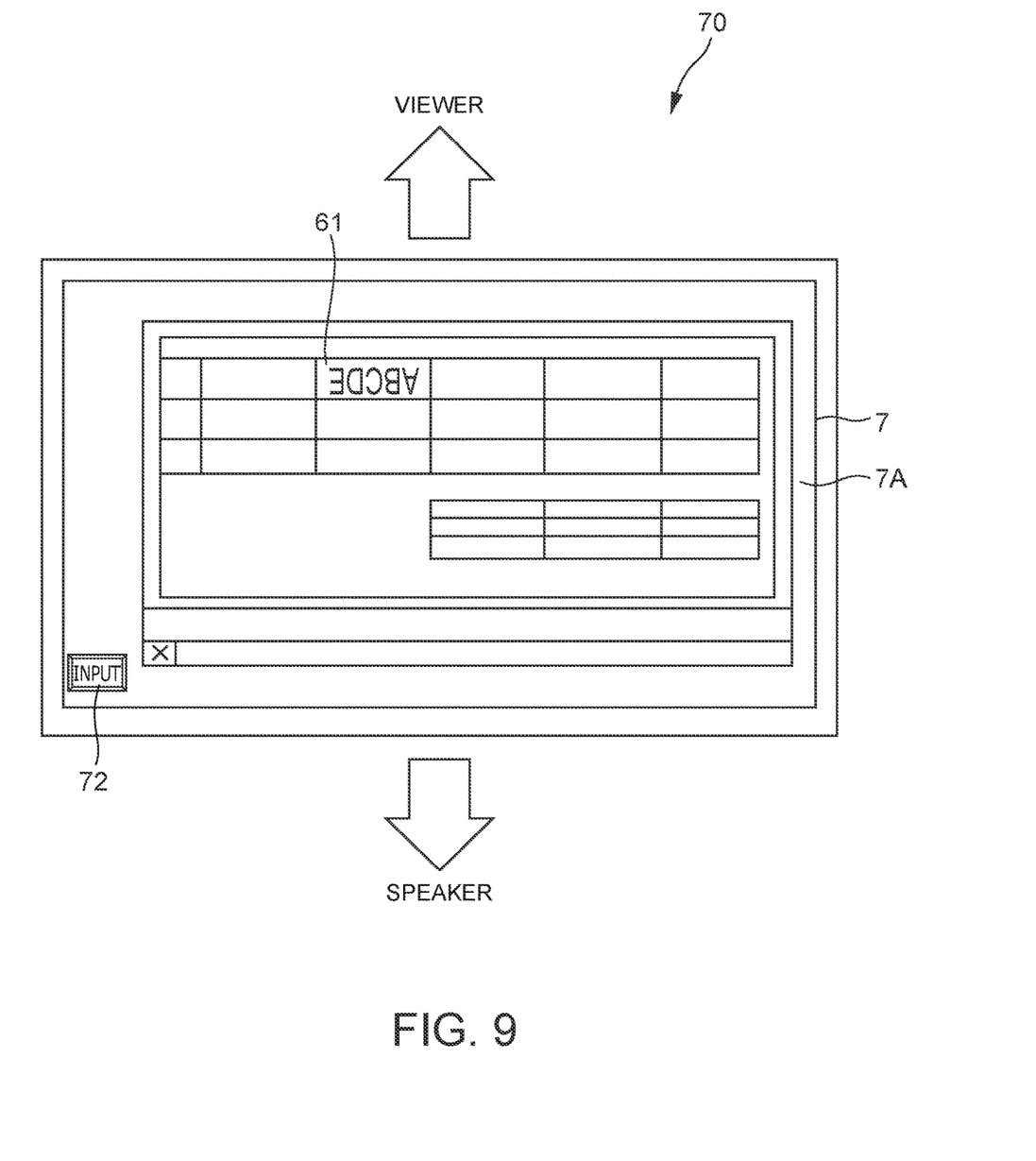
FIG. 9 shows the appearance of a tablet-type device according to one embodiment when the device is used for presentation.

FIG. 9 shows the appearance of the tablet-type device 70 when the device is used for presentation. In the example of FIG. 9, the LCD screen 7A as a whole is directed to the viewer. When the flip mode is turned ON, a button 72 that is pressed by a user for input operation is displayed on the LCD screen 7A.

That is, when the flip mode is turned ON, the LCD screen 7A as a whole is not directed to the speaker who is the user performing the input operation. Then, the timing when the user presses the button 72 is detected as the timing when the speaker performs input operation. Then, the input field displayed on the touch-screen display 7 is directed to the direction set beforehand.

Figure 10:
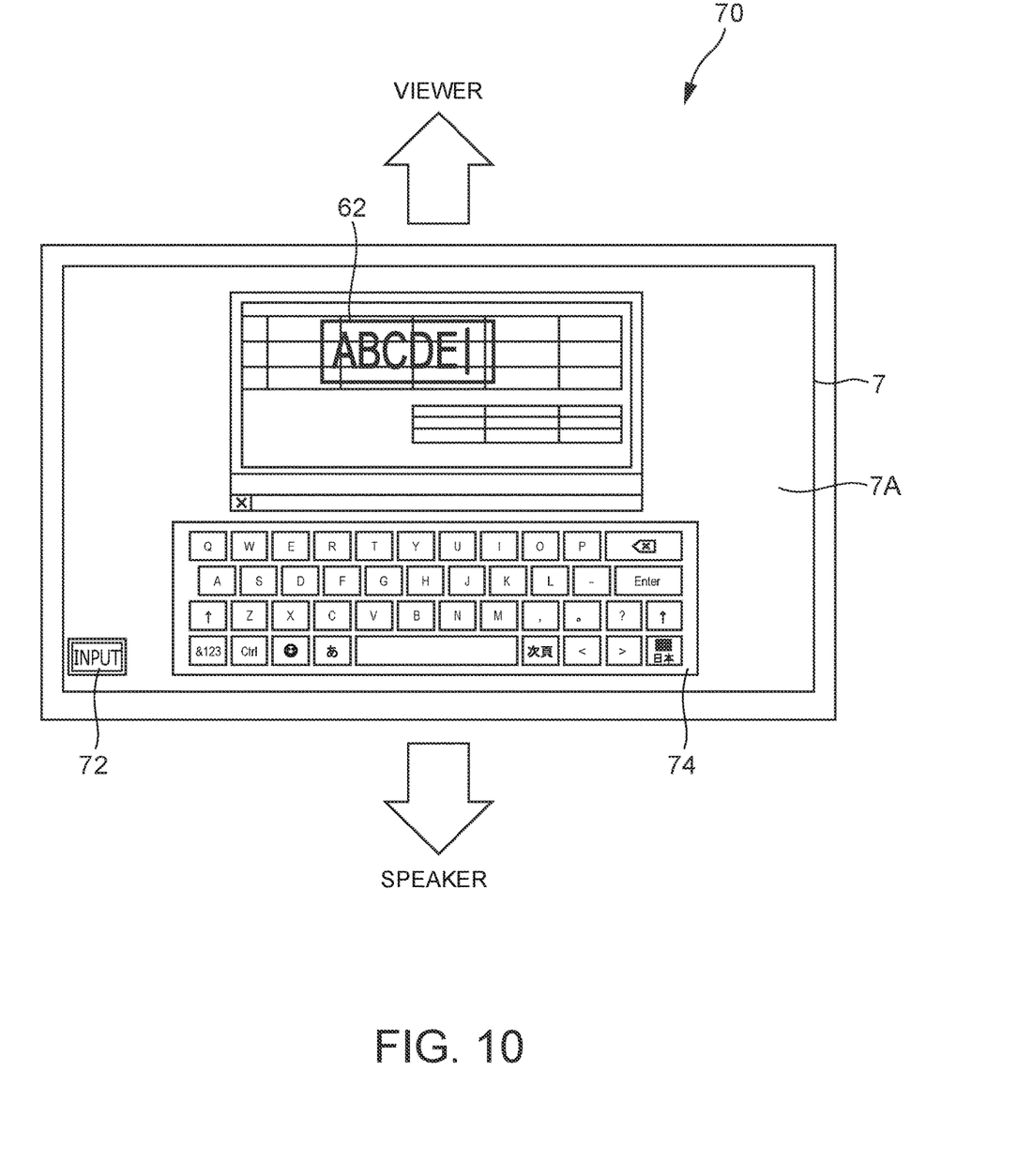
FIG. 10 shows a tablet-type device according to one embodiment in which an input field is popped up.

FIG. 10 shows the flip mode in which the input field is displayed as a popup window 62.

When the popup window 62 is displayed on the touch-screen display 7, a software keyboard 74 also is displayed thereon. The popup window 62 and the software keyboard 74 are directed toward the speaker. That is, in the example of FIG. 10, the popup window 62 and the software keyboard 74 are displayed in the direction rotated at 180 degrees relative to the LCD screen 7A as a whole.

For the displaying of the software keyboard 74, the image displayed on the touch-screen display 7 before is reduced in size and displayed.

In the flip mode, instead of displaying the popup window 62 as in FIG. 10, the input field itself may be rotated or the LCD screen 7A as a whole may be rotated.

Then, when the button 72 is pressed again, for example, this is detected as the input-end timing. Then, the popup window 62 and the software keyboard 74 disappear, and the display is returned to the original state, in which the content of the input operation is reproduced.

The procedure of the processing when the flip mode is turned ON as described above is one example, and unnecessary steps may be removed, new steps may be added or the order of the steps may be changed without deviating from the scope of the disclosure.

DESCRIPTION OF SYMBOLS

1 laptop PC (information processing device)
2 body chassis (first chassis)
3 display chassis (second chassis)
4 input part
7 touch-screen display (display)
54 LCD image rotation control part (display image rotation unit)
58 timing detection part (timing detection unit)
60 input field display control part (input area display unit)
70 tablet-type device (information processing device)

What is claimed is:

1. An apparatus, comprising
a display that displays an image that is associated with an application;
a timing detection unit that detects a timing when a user performs an input operation; and
an input area display unit that
displays an input area that is associated with the application and rotated relative to the image, as a target of the input operation after the timing detection unit detects the input operation, and
superimposes the input area on the image while maintaining the rotation of the input area relative to the image;
wherein
the image associated with the application and the input area associated with the application are not oriented towards the same direction.

2. The apparatus of claim 1, comprising:
a display image rotation unit that rotates the image displayed on the display by a predetermined angle.

3. The apparatus of claim 2, further comprising
a first chassis comprising an input section; and
a second chassis that is coupled to the display.

4. The apparatus of claim 3, wherein the preset direction is a direction towards the input section.

5. The apparatus of claim 3, further comprising
a position detection unit that detects the position of the second chassis relative to the first chassis;
wherein
the input area display unit displays the input area only if the position detection unit detects that the first chassis and the second chassis are substantially in a predetermined configuration, and
the display image rotation unit rotates the image displayed on the display only if the detection unit detects that the first chassis and the second chassis are substantially in a predetermined configuration.

6. The apparatus of claim 5, wherein the predetermined configuration comprises a configuration wherein the second chassis is at an angle of 180 degrees relative to the first chassis.

7. The apparatus of claim 2, wherein the input area display unit rotates the image towards the preset direction if the input operation matches a preset type of input operation.

8. The apparatus of claim 1, wherein the input area display unit displays the input area in a pop-up.

9. A method, comprising
displaying an image that is associated with an application on a display of an electronic device;
detecting a timing when a user performs an input operation to the electronic device;
displaying an input area that is associated with the application and rotated relative to the image, as a target of the input operation; and
superimposing the input area on the image while maintaining the rotation of the input area relative to the image;
wherein
the image associated with the application and the input area associated with the application are not oriented towards the same direction.

10. The method of claim 9, further comprising
rotating the image displayed on the display of the electronic device by a predetermined angle.

11. The method of claim 10, wherein the electronic device comprises
a first chassis comprising an input section, and
a second chassis that is coupled to the display.

12. The method of claim 11, wherein the preset direction is directed towards the input section.

13. The method of claim 11, further comprising
detecting the position of the second chassis relative to the second chassis;
wherein
displaying an input area oriented towards a preset direction on the display of the electronic device as a target of the input operation comprises displaying the input area only if the first chassis and the second chassis are substantially in a predetermined configuration; and
rotating the image displayed on the display of the electronic device by a predetermined angle comprises rotating the image displayed on the display only if the first chassis and the second chassis are substantially in a predetermined configuration.

14. The method of claim 13, wherein the predetermined configuration comprises a configuration wherein the second chassis is at an angle of 180 degrees relative to the first chassis.

15. The method of claim 10, wherein rotating the image displayed on the display of the electronic device by a predetermined angle comprises
rotating the image displayed on the display of the electronic device by a predetermined angle if the input operation matches a preset type of input operation.

16. The method of claim 9, wherein displaying an input area oriented towards a preset direction on the display of the electronic device as a target of the input operation comprises displaying an input area in a pop-up towards a preset direction on the display of the electronic device as a target of the input operation.

17. A computer program product comprising a non-transitory computer readable storage medium that stores code executable by a processor, the executable code comprising code to perform:
displaying an image that is associated with an application on a display of an electronic device;
detecting a timing when a user performs an input operation to the electronic device;
displaying an input area that is associated with the application and rotated relative to the image as a target of the input operation; and
superimposing the input area on the image while maintaining the rotation of the input area relative to the image;
wherein
the image associated with the application and the input area associated with the application are not oriented towards the same direction.

18. The computer program product of claim 17, further comprising
rotating the image displayed on the display of the electronic device by a predetermined angle.

* * * * *